US012734689B2

(12) United States Patent
Okumatsu

(10) Patent No.: US 12,734,689 B2
(45) Date of Patent: Sep. 15, 2026

(54) CONTROL SYSTEM, CONTROL METHOD, AND NON-TRANSITORY STORAGE MEDIUM

(71) Applicant: TOYOTA JIDOSHA KABUSHIKI KAISHA, Toyota (JP)

(72) Inventor: Yoshihiro Okumatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 18/760,822

(22) Filed: Jul. 1, 2024

(65) Prior Publication Data

US 2025/0033202 A1 Jan. 30, 2025

(30) Foreign Application Priority Data

Jul. 24, 2023 (JP) ................................ 2023-119609

(51) Int. Cl.
*B25J 9/16* (2006.01)

(52) U.S. Cl.
CPC .................................. *B25J 9/1638* (2013.01)

(58) Field of Classification Search
None
See application file for complete search history.

(56) References Cited

U.S. PATENT DOCUMENTS

2015/0039128 A1 2/2015 Oaki
2019/0367079 A1* 12/2019 Kodera ................. B62D 6/002
2019/0393817 A1* 12/2019 Eguchi .................... H02P 21/22
2020/0114900 A1* 4/2020 Lee ....................... B60W 20/30
2021/0323147 A1* 10/2021 Oaki ...................... B25J 13/085
2023/0158669 A1* 5/2023 Yu ......................... B25J 9/1633
700/261

FOREIGN PATENT DOCUMENTS

JP H05-252779 A 9/1993
JP 2016-039737 A 3/2016
JP 6097174 B2 3/2017
JP 2019-221112 A 12/2019

OTHER PUBLICATIONS

Nagano et al., "Backdrivability Improvement Method Based on Angular Transmission Error in a High Reduction gear," IEEJ Journal of Industry Applications, 2019, vol. 8, No. 5, pp. 779-786.

* cited by examiner

*Primary Examiner* — Adam R Mott
*Assistant Examiner* — Alan Lindsay Ostrow
(74) *Attorney, Agent, or Firm* — Oliff PLC

(57) ABSTRACT

A control system includes: a torque command generator configured to generate a torque command value for an actuator; an inertia compensation calculator configured to calculate an inertia compensation command value based on a derivative of a q-axis current of the actuator, and a drive command calculator configured to calculate a drive command value by adding the torque command value generated by the torque command generator to the inertia compensation command value calculated by the inertia compensation calculator, and output the drive command value to the actuator.

4 Claims, 5 Drawing Sheets

10
11
12
13
14
15

CONTROL SYSTEM, CONTROL METHOD, AND NON-TRANSITORY STORAGE MEDIUM

CROSS-REFERENCE TO RELATED APPLICATION

This application claims priority to Japanese Patent Application No. 2023-119609 filed on Jul. 24, 2023 incorporated herein by reference in its entirety.

BACKGROUND

1. Technical Field

The present disclosure relates to control systems, control methods, and non-temporary storage media that control an actuator of a robot etc.

2. Description of Related Art

There is a control system that perform inertia compensation by feedback control using an acceleration sensor and an observer in order to improve back-drivability (see, for example, Japanese Patent No. 6097174 (JP 6097174 B)).

SUMMARY

Some control systems perform inertia compensation by, for example, performing machine learning. The above control system requires an additional sensor such as the acceleration sensor to perform inertia compensation, which may complicate the configuration.

The present disclosure provides a control system, control method, and non-transitory storage medium that can improve back-drivability while simplifying the configuration.

A first aspect of the present disclosure is a control system. The control system includes: a torque command generator configured to generate a torque command value for an actuator; an inertia compensation calculator configured to calculate an inertia compensation command value based on a derivative of a q-axis current of the actuator; and a drive command calculator configured to calculate a drive command value by adding the torque command value generated by the torque command generator to the inertia compensation command value calculated by the inertia compensation calculator, and output the drive command value to the actuator.

In the control system according to the first aspect of the present disclosure, the inertia compensation calculator may be configured to calculate the inertia compensation command value based on the q-axis current and a following expression. In the following expression, $$T_a^*$$

is the inertia compensation command value, $I_q$ is the q-axis current, $I_{an}$ is an inertia compensation coefficient, and $\tau_a$ is a time constant used to pseudo-differentiate the q-axis current $I_q$.

$$T_a^* = I_{an}\frac{1}{1+\tau_a s}\frac{d}{dt}I_q \quad (7)$$

A second aspect of the disclosure is a control method. The control method includes: generating a torque command value for an actuator; calculating an inertia compensation command value based on a derivative of a q-axis current of the actuator; and calculating a drive command value by adding the torque command value to the inertia compensation command value, and outputting the drive command value to the actuator.

A third aspect of the present disclosure is a non-transitory storage medium storing instructions that are executable by one or more processors and that cause the one or more processors to perform functions. The functions include: generating a torque command value for an actuator; calculating an inertia compensation command value based on a derivative of a q-axis current of the actuator; and calculating a drive command value by adding the torque command value to the inertia compensation command value, and outputting the drive command value to the actuator.

According to the present disclosure, it is possible to provide a control system, control method, and non-transitory storage medium that can improve back-drivability while simplifying the configuration.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment will be described with reference to the drawings. There has been a demand for robots that perform flexible operations for their coexistence with humans. In order to increase the flexibility of a robot, it is important to improve the back-drivability of actuators at the joints of the robot.

There is a trade-off between improving the back-drivability of an actuator and implementing a smaller, lighter, and higher-torque actuator. It is therefore useful to improve the back-drivability of an actuator through compensation control proportional to acceleration.

On the other hand, a control system that performs inertia compensation by feedback control using an acceleration sensor and an observer requires an additional sensor such as the acceleration sensor to perform inertia compensation, which may complicate the configuration. Moreover, since this control system performs feedback control using an observer, it does not have sufficient responsiveness.

A control system according to the present embodiment uses the derivative of the q-axis current instead of acceleration, and performs inertia compensation by providing a torque command for inertia to an actuator using feedforward control.

This eliminates the need for an additional sensor such as an acceleration sensor and thus simplifies the configuration, so that the back-drivability can be improved while achieving reduction in cost and size. Moreover, performing inertia compensation by feedforward control that does not use an observer rather than feedback control that uses an observer provides sufficient responsiveness.

Figure 1:
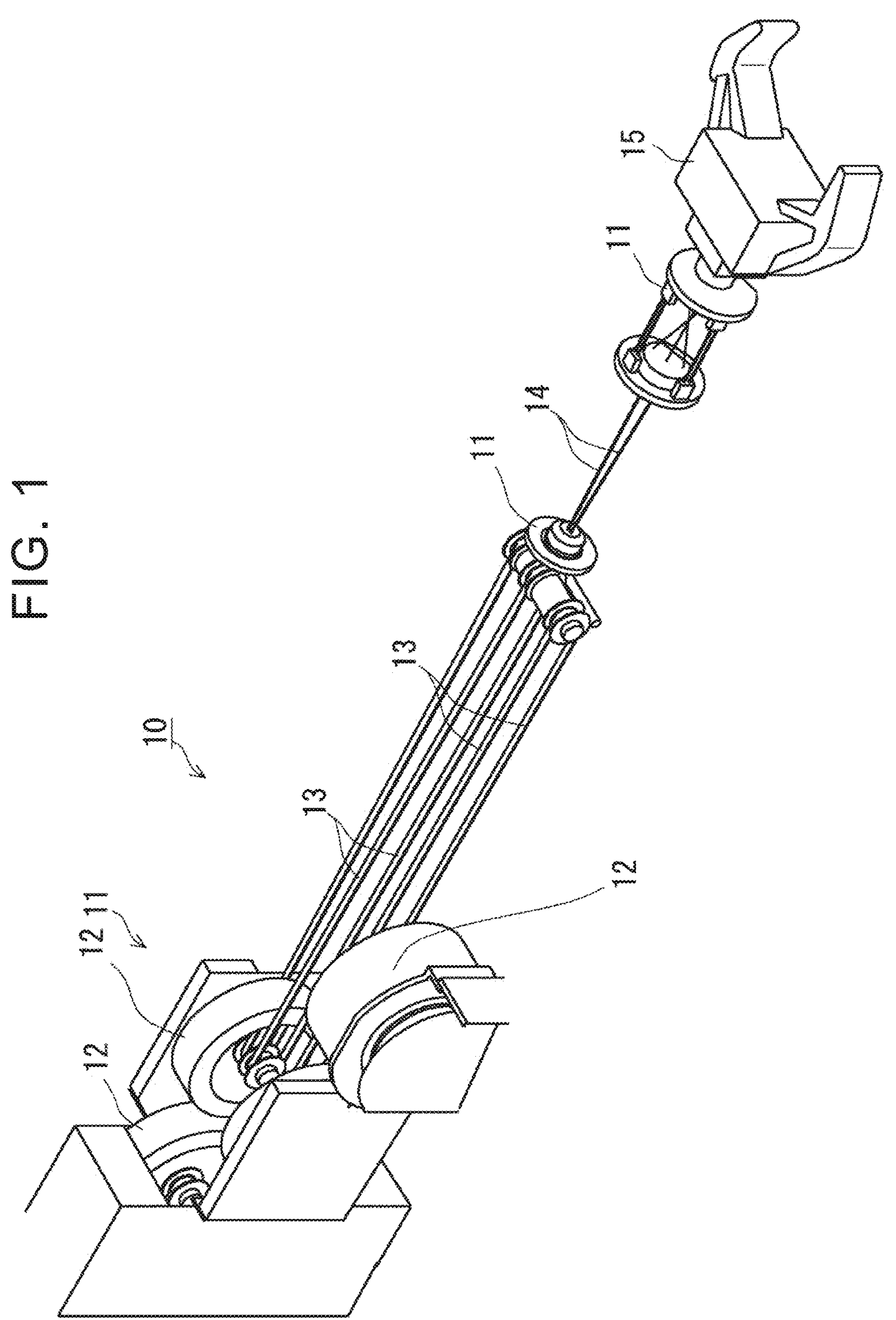
FIG. 1 shows a schematic configuration of a robot arm according to an embodiment.

The control system according to the present embodiment controls, for example, a robot arm 10 shown in FIG. 1. The robot arm 10 is configured as an articulated arm with a plurality of joint portions 11. Each joint portion 11 is configured to rotate about multiple axes. The joint portions 11 are connected to each other via a link etc.

A plurality of actuators 12 that drivingly rotates the individual joint portions 11 is concentratedly mounted at the base of the robot arm 10. Each actuator 12 drivingly rotates the corresponding joint portion 11 via a belt 13, a wire 14, etc. This configuration can reduce the weight of a body of the robot arm 10 and improve the back-drivability.

The actuator 12 includes, for example, a motor such as a servo motor and a speed reducer that reduces the driving force of the motor. An end effector 15 that can grip an object is mounted at a distal end of the robot arm 10.

Figure 2:
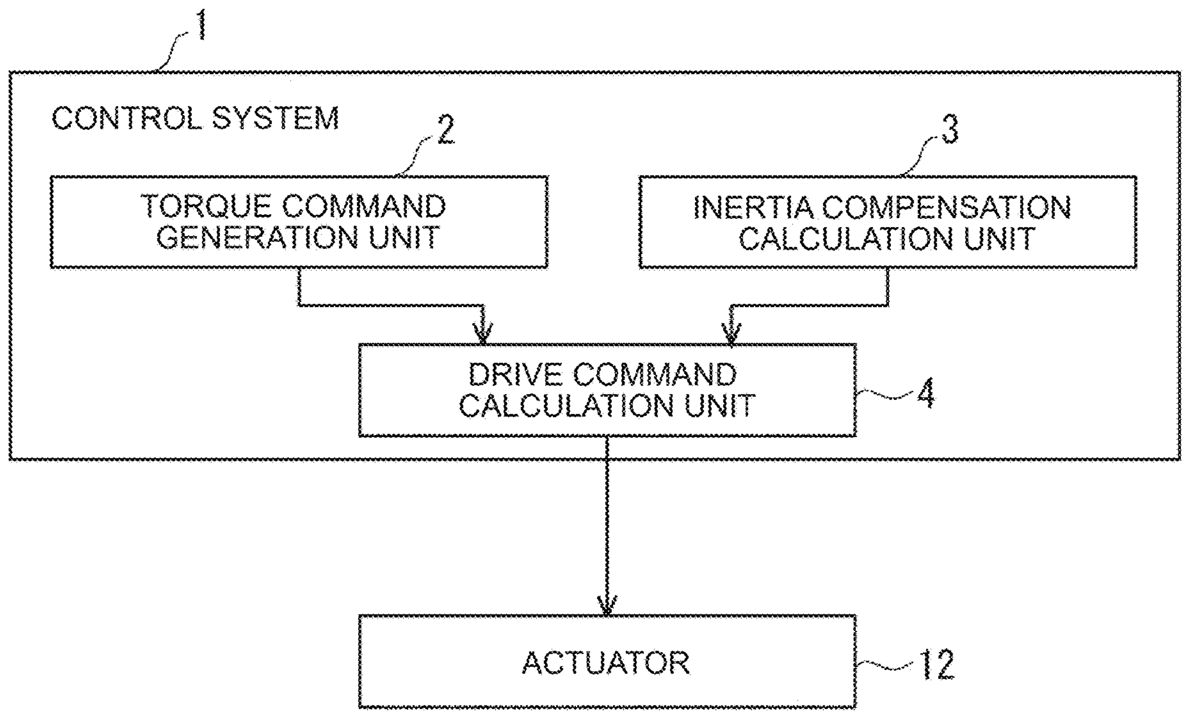
FIG. 2 is a block diagram showing a schematic system configuration of a control system according to the embodiment.

FIG. 2 is a block diagram showing a schematic system configuration of the control system according to the present embodiment. The control system 1 according to the present embodiment includes a torque command generation unit 2, an inertia compensation calculation unit 3, and a drive command calculation unit 4.

The control system 1 has a hardware configuration of a common computer including, for example, a processor such as a central processing unit (CPU) and a graphic processing unit (GPU), an internal memory such as a random access memory (RAM) and a read-only memory (ROM), a storage device such as a hard disk drive (HDD) and a solid state drive (SSD), an input and output interface (I/F) for connecting a peripheral device such as a display, and a communication I/F for communicating with an external device.

The torque command generation unit 2 is a specific example of the torque command generator. The torque command generation unit 2 generates a torque command value for the actuator 12. The torque command generation unit 2 outputs the generated torque command value to the drive command calculation unit 4.

The inertia compensation calculation unit 3 is a specific example of the inertia compensation calculator. The inertia compensation calculation unit 3 calculates an inertia compensation command value based on the derivative of the q-axis current of the actuator 12.

A method for calculating an inertia compensation command value will be described in detail. The back-drivability is defined as, for example, the ease of movement of the actuator 12 when the actuator 12 is moved with an external force. In robots, the actuator 12, especially its reduction gear, is the main cause of a reduction in back-drivability.

Back-drive torque $T_r$ representing the back-drivability is typically defined by the following expression (1).

$$T_f = T_s + I_a\ddot{\theta} + C_a\dot{\theta} + K_a\theta \tag{1}$$

In the above expression (1), $T_s$ is a static friction force, θ is the output shaft angle of the actuator 12, $K_a$ is a stiffness coefficient, and Ca is a viscosity coefficient. $I_a$ is an inertia coefficient and is, for example, the nominal value of the moment of inertia of the motor.

In the present embodiment, the following assumptions can be made for the above expression (1).

Since the actuator 12 is a hardware configuration composed of a motor and a speed reducer, the term with $K_a$ can be ignored.

Since the actuator 12 is in operation, the term $T_s$ can be ignored.

Compared to the torque in the term with $I_a$, cogging torque is very small and can be ignored.

The term with Ca can be ignored because it is compensated for by a different method.

Based on the above assumptions, the above expression (1) can be rewritten as the following expression (2).

$$T_f = I_a\ddot{\theta} \tag{2}$$

Since the back-drive torque $T_r$ can be given by the torque constant $K_t$ and the q-axis current $I_q$, the above expression (2) can be rewritten as the following expression (3).

$$T_f = K_t I_q = I_a\ddot{\theta} \tag{3}$$

The following expression (4) is derived by transforming the above expression (3), and the following expression (5) is derived by transforming the expression (4).

$$I_q = \frac{I_a}{K_t}\ddot{\theta} \tag{4}$$

$$\frac{d}{dt}I_q = \frac{I_a}{K_t}\frac{d}{dt}\ddot{\theta} \tag{5}$$

The third derivative of the angle is physically jerk, but when actually differentiating the angle in the above expression (5), pseudo-differentiation is performed with an low-pass filter (LPF), so that the following expression (6) is derived.

$$\frac{1}{1+\tau s}\frac{d}{dt}I_q \fallingdotseq \frac{I_a}{K_t}\ddot{\theta} \tag{6}$$

By appropriately selecting the time constant τ of the LPF, the derivative of the q-axis current, that is, a change in q-axis current over time, can be used instead of acceleration. The following expression (7) can be derived from the above expression (6), and an inertia compensation command value $$T_a^*$$

can be calculated using this expression (7).

$$T_a^* = I_{an}\frac{1}{1+\tau_a s}\frac{d}{dt}I_q \tag{7}$$

In the above expression (7), $\tau_a$ is a time constant used to pseudo-differentiate the q-axis current $I_q$. $I_{an}$ is an inertia compensation coefficient, and is calculated by the expression of $I_{an}=K_t/I_a$. The above calculated value is actually adjusted to a value that does not diverge.

$\tau_a$ is adjusted so as to be in phase with the second derivative of the angle in a speed region where inertia compensation is required. At that time, the amplitude may become small depending on the magnitude of the gain. The value of $I_{an}$ is determined also in consideration of the magnitude of the gain.

Figure 3:
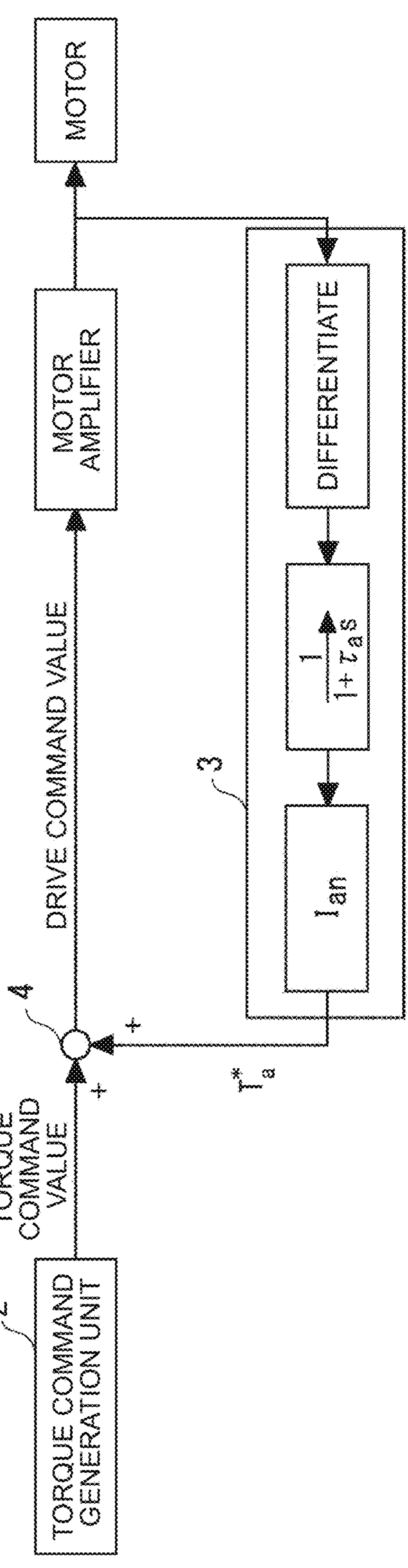
FIG. 3 is a control block diagram of the control system according to the embodiment.

FIG. 3 is a control block diagram of the control system 1 according to the present embodiment. The inertia compensation calculation unit 3 calculates the derivative of the q-axis current based on a current value output from a motor amplifier. The inertia compensation calculation unit 3 calculates an inertia compensation command value $$T_a^*$$

based on the calculated derivative of the q-axis current and the above expression (7). The inertia compensation calculation unit 3 outputs the calculated inertia compensation command value $$T_a^*$$

to the drive command calculation unit 4.

The drive command calculation unit 4 is a specific example of the drive command calculator. The drive command calculation unit 4 calculates a drive command value by adding a torque command value generated by the torque command generation unit 2 to the inertia compensation command value $$T_a^*$$

calculated by the inertia compensation calculation unit 3. The drive command calculation unit 4 outputs the calculated drive command value to the actuator (motor) 12 via the motor amplifier. The actuator 12 is drivingly rotated according to the drive command value from the drive command calculation unit 4.

Figure 4:
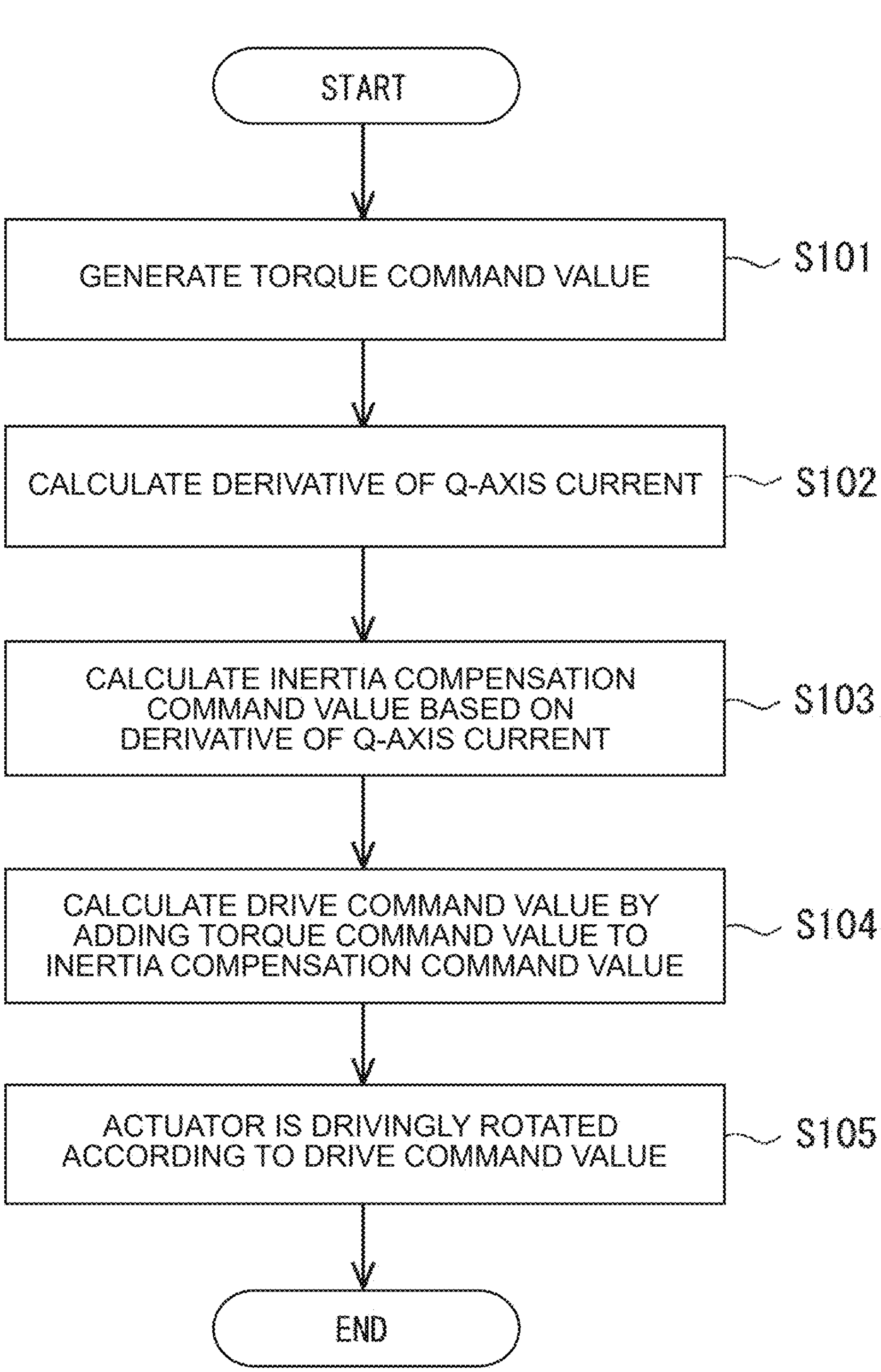
FIG. 4 is a flowchart of a control method according to the embodiment.

Next, a control method that is performed by the control system 1 according to the present embodiment will be described. FIG. 4 is a flowchart of the control method according to the present embodiment.

The torque command generation unit 2 generates a torque command value for the actuator 12, and outputs the generated torque command value to the drive command calculation unit 4 (step S101).

The inertia compensation calculation unit 3 calculates the derivative of the q-axis current based on a current value output from the motor amplifier etc. (step S102). The inertia compensation calculation unit 3 calculates an inertia compensation command value based on the calculated derivative of the q-axis current and the above expression (7), and outputs the calculated inertia compensation command value to the drive command calculation unit 4 (step S103).

The drive command calculation unit 4 calculates a drive command value by adding the torque command value generated by the torque command generation unit 2 to the inertia compensation command value calculated by the inertia compensation calculation unit 3, and outputs the calculated drive command value to the actuator 12 (step S104). The actuator 12 is drivingly rotated according to the drive command value from the drive command calculation unit 4 (step S105).

Next, the results of an experiment comparing the operation of the motor of the control system 1 of the present embodiment that performs inertia compensation and the operation of a motor that does not perform inertia compensation will be described. This experiment compares changes in motor rotational speed when each motor is rotated with an external force applied by hand etc.

Figure 5:
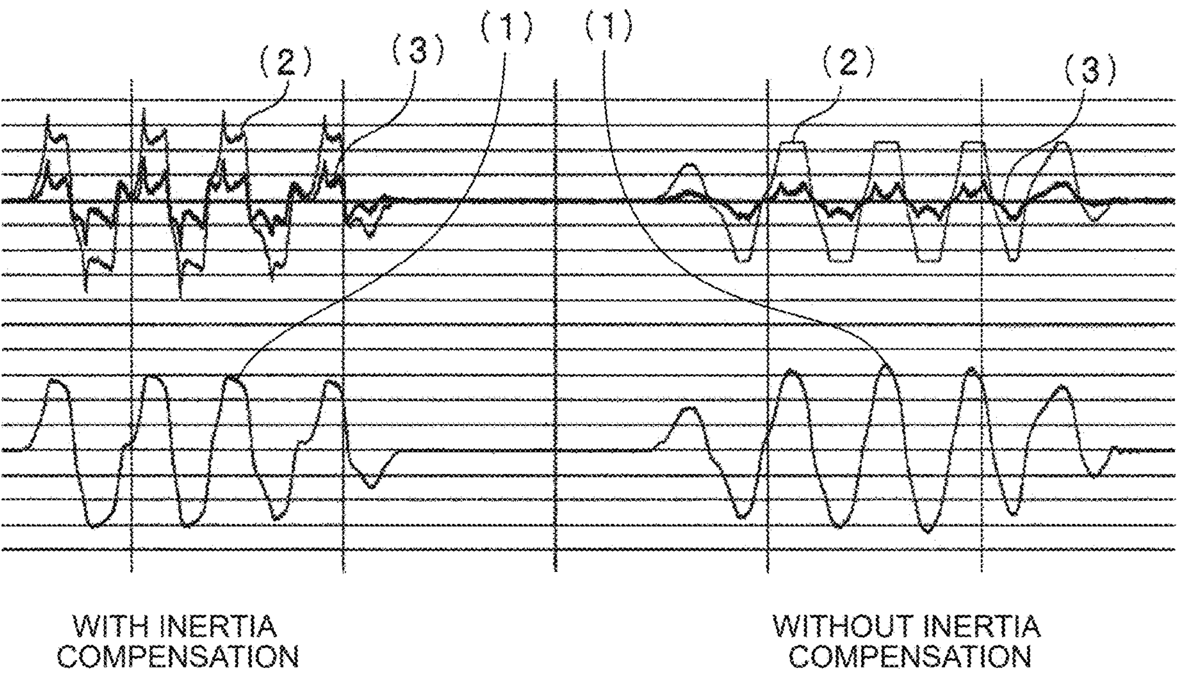
FIG. 5 shows experimental results of the control system according to the embodiment.

FIG. 5 shows the experimental results of the control system 1 according to the present embodiment. Line (1) in the lower left part of FIG. 5 shows a change in rotational speed of the motor of the control system according to the present embodiment that performs inertia compensation. Line (1) in the lower right part of FIG. 5 shows a change in rotational speed of the motor that does not perform inertia compensation. Thin lines (2) in the upper part of FIG. 5 show the compensation command value, and thick lines (3) in the upper part of FIG. 5 show the q-axis current value.

It can be seen from FIG. 5 that the motor of the present embodiment that performs inertia compensation accelerates more when the speed changes, that is, when accelerating, compared to the motor that does not perform inertia compensation. This shows that increasing the torque during acceleration through inertia compensation facilitates rotation of the motor when the motor is rotated with an external force applied by hand etc. Accordingly, the results show that the inertia compensation by the control system 1 according to the present embodiment is functioning effectively.

As described above, the control system 1 according to the present embodiment includes: the torque command generation unit 2 that generates a torque command value for the actuator 12; the inertia compensation calculation unit 3 that calculates an inertia compensation command value based on the derivative of the q-axis current of the actuator 12; and the drive command calculation unit 4 that calculates a drive command value by adding the torque command value generated by the torque command generation unit 2 to the inertia compensation command value calculated by the inertia compensation calculation unit 3, and outputs the calculated drive command value to the actuator 12.

This eliminates the need for an additional sensor such as an acceleration sensor and thus simplifies the configuration, so that the back-drivability can be improved while achieving reduction in cost and size. Moreover, performing inertia compensation by feedforward control that does not use an observer rather than feedback control that uses an observer provides sufficient responsiveness.

Although the embodiment of the present disclosure is described above, the embodiment is presented by way of example only and is not intended to limit the scope of the disclosure. This novel embodiment can be carried out in various other modes, and various omissions, replacements, and modifications can be made without departing from the scope of the disclosure. The above embodiment and modifications thereof are included in the scope and gist of the disclosure, and are included in the scope of the disclosure described in the claims and equivalents thereof.

In the present disclosure, the process shown in FIG. 4 can also be implemented by, for example, causing a processor to execute a computer program.

The program can be stored and supplied to the computer by using various types of non-transitory computer-readable media. The non-transitory computer-readable media include various types of tangible recording media. Examples of the non-transitory computer-readable media include a magnetic recording medium (e.g., a floppy disk, a magnetic tape, and a hard disk drive), a magneto-optical recording medium (e.g., a magneto-optical disk), a compact disc read-only memory (CD-ROM), a compact disc-recordable (CD-R), a compact disc-rewritable (CD-RW), and a semiconductor memory (e.g., a mask ROM, a programmable ROM (PROM), an erasable PROM (EPROM), a flash ROM, and a random access memory (RAM)).

The program may be supplied to the computer by various types of transitory computer-readable media. Examples of the transitory computer-readable media include electrical signals, optical signals, and electromagnetic waves. The transitory computer-readable media can supply the program to the computer via a wired communication path such as electric wire and optical fiber, or a wireless communication path.

The parts constituting the control system 1 according to the above embodiment need not necessarily be implemented by the program. Part or all of the parts constituting the control system 1 may be implemented by dedicated hardware such as an application-specific integrated circuit (ASIC) or a field programmable gate array (FPGA).

What is claimed is:

1. A control system, comprising:

a processor that is configured to:

generate a torque command value for an actuator;

calculate an inertia compensation command value based on a derivative of a q-axis current of the actuator;

calculate a drive command value by adding the torque command value generated to the inertia compensation command value; and output the drive command value to the actuator, wherein the processor is configured to calculate the inertia compensation command value to compensate for torque components caused by actuator inertia, and add the inertia compensation command value calculated to the torque command value generated as feedforward control to calculate the drive command value.

2. The control system according to claim 1, wherein the processor is configured to calculate the inertia compensation command value based on the q-axis current and a following expression $$T_a^* = I_{an}\frac{1}{1+\tau_a s}\frac{d}{dt}I_q, \quad (7)$$

where $$T_a^*$$

is the inertia compensation command value, $I_q$ is the q-axis current, $I_{an}$ is an inertia compensation coefficient, and $\tau_a$ is a time constant used to pseudo-differentiate the q-axis current $I_q$.

3. A control method, comprising:

generating a torque command value for an actuator;

calculating an inertia compensation command value based on a derivative of a q-axis current of the actuator; and calculating a drive command value by adding the torque command value to the inertia compensation command value, and outputting the drive command value to the actuator, wherein the inertia compensation command value is calculated to compensate for torque components caused by actuator inertia, and the inertia compensation command value calculated is added to the torque command value generated as feedforward control to calculate the drive command value.

4. A non-transitory storage medium storing instructions that are executable by one or more processors and that cause the one or more processors to perform functions comprising:

generating a torque command value for an actuator;

calculating an inertia compensation command value based on a derivative of a q-axis current of the actuator; and calculating a drive command value by adding the torque command value to the inertia compensation command value, and outputting the drive command value to the actuator, wherein the inertia compensation command value is calculated to compensate for torque components caused by actuator inertia, and the inertia compensation command value calculated is added to the torque command value generated as feedforward control to calculate the drive command value.

* * * * *